(12) United States Patent
Aggarwal

(10) Patent No.: US 7,889,751 B2
(45) Date of Patent: Feb. 15, 2011

(54) LOW POWER WIRELESS COMMUNICATION SYSTEM

(75) Inventor: Sudhir Aggarwal, 273 Saint Henry Dr., Fremont, CA (US) 94539

(73) Assignee: Sudhir Aggarwal, Fremont, CA (US)

( * ) Notice: Subject to any disclaimer, the term of this patent is extended or adjusted under 35 U.S.C. 154(b) by 487 days.

(21) Appl. No.: 11/682,748

(22) Filed: Mar. 6, 2007

(65) Prior Publication Data

US 2008/0219378 A1    Sep. 11, 2008

(51) Int. Cl.
*H04L 12/56* (2006.01)

(52) U.S. Cl. .................. 370/419; 370/546; 375/224; 375/259; 375/268; 375/270; 375/295; 375/298; 375/300; 375/301; 375/316; 375/320; 375/321; 375/377

(58) Field of Classification Search .................. None
See application file for complete search history.

(56) References Cited

U.S. PATENT DOCUMENTS

| | | | | |
|---|---|---|---|---|
| 4,130,802 A * | 12/1978 | Nossen et al. | ........... | 375/282 |
| 4,973,977 A | 11/1990 | Hawkins et al. | | |
| 5,757,767 A * | 5/1998 | Zehavi | ........... | 370/208 |
| 5,896,060 A * | 4/1999 | Ovard et al. | ........... | 329/304 |
| 6,265,948 B1 * | 7/2001 | Stevenson | ........... | 332/101 |
| 6,313,700 B1 * | 11/2001 | Nishijima et al. | ........... | 330/51 |
| 6,339,621 B1 * | 1/2002 | Cojocaru et al. | ........... | 375/247 |
| 6,483,355 B1 * | 11/2002 | Lee et al. | ........... | 327/113 |
| 6,864,644 B2 * | 3/2005 | Kernahan | ........... | 315/307 |
| 7,020,447 B2 * | 3/2006 | Nagatani et al. | ........... | 455/114.3 |
| 7,106,782 B2 * | 9/2006 | Howard et al. | ........... | 375/146 |
| 7,505,479 B2 * | 3/2009 | Meng | ........... | 370/465 |
| 7,523,153 B2 * | 4/2009 | Goyal | ........... | 708/714 |
| 7,693,494 B2 * | 4/2010 | Litmanen et al. | ........... | 455/91 |
| 2003/0179815 A1 * | 9/2003 | Kandiar | ........... | 375/219 |
| 2004/0101037 A1 * | 5/2004 | Meng | ........... | 375/220 |
| 2004/0125632 A1 * | 7/2004 | Regev et al. | ........... | 365/49 |
| 2004/0207464 A1 * | 10/2004 | Petrovic et al. | ........... | 329/315 |

(Continued)

*Primary Examiner*—Hong Cho
*Assistant Examiner*—Ajay P Cattungal
(74) *Attorney, Agent, or Firm*—Blakely Sokoloff Taylor & Zafman LLP

(57) ABSTRACT

A transmitter, a receiver, and a transceiver for use in a wireless communication system are disclosed. In one embodiment, the radio frequency (RF) transmitter comprises a first parallel-to-serial converter to convert first parallel data corresponding to a I quadrature baseband signal component into a first set of serial data bits, a second parallel-to-serial converter to convert second parallel data corresponding to a Q quadrature baseband signal component into a second set of serial data bits, and one or more stages having a first XOR gate coupled to a gate terminal of a first transistor and a second XOR gate coupled to a gate terminal of second transistor. The first XOR gate has a pair of inputs coupled to the first set of serial data bits and a first clock (e.g., an I clock) that corresponds to the I quadrature baseband signal component, and has a first output coupled to drive the gate terminal of the first transistor, while the second XOR gate has a pair of inputs coupled to the second set of serial data bits and a second clock (e.g., the Q clock) that corresponds to the Q quadrature baseband signal component, and has a second output coupled to drive the gate terminal of the second transistor. The first and second outputs are summed at a node to obtain a single-side band (SSB) RF output.

16 Claims, 5 Drawing Sheets

Block schematic of the digital QAM SSB transmitter with all digital DAC, Mixer, VGA.

U.S. PATENT DOCUMENTS

| | | | |
|---|---|---|---|
| 2005/0140422 A1* | 6/2005 | Klemmer | 327/337 |
| 2005/0179423 A1* | 8/2005 | Xing | 323/282 |
| 2005/0239417 A1* | 10/2005 | Boos | 455/86 |
| 2006/0133528 A1* | 6/2006 | Koga et al. | 375/260 |
| 2006/0226903 A1* | 10/2006 | Muller et al. | 330/149 |
| 2006/0291589 A1* | 12/2006 | Eliezer et al. | 375/302 |
| 2007/0021933 A1* | 1/2007 | Sanduleanu et al. | 702/72 |
| 2007/0030031 A1* | 2/2007 | Degrendel et al. | 326/95 |
| 2007/0035337 A1* | 2/2007 | Kim et al. | 327/158 |
| 2007/0069764 A1 | 3/2007 | Lewis et al. | |
| 2007/0071115 A1* | 3/2007 | Suzuki et al. | 375/260 |
| 2007/0110204 A1* | 5/2007 | Santhoff et al. | 375/355 |
| 2007/0116104 A1* | 5/2007 | Fujiwara et al. | 375/149 |
| 2007/0139237 A1* | 6/2007 | Madurawe | 341/106 |
| 2007/0194924 A1* | 8/2007 | Karr | 340/572.1 |
| 2007/0205872 A1* | 9/2007 | Kim et al. | 340/10.33 |
| 2008/0219378 A1* | 9/2008 | Aggarwal | 375/298 |
| 2008/0291971 A1* | 11/2008 | Chin Po Shin et al. | 375/130 |
| 2008/0316912 A1* | 12/2008 | Al Adnani | 370/210 |

* cited by examiner

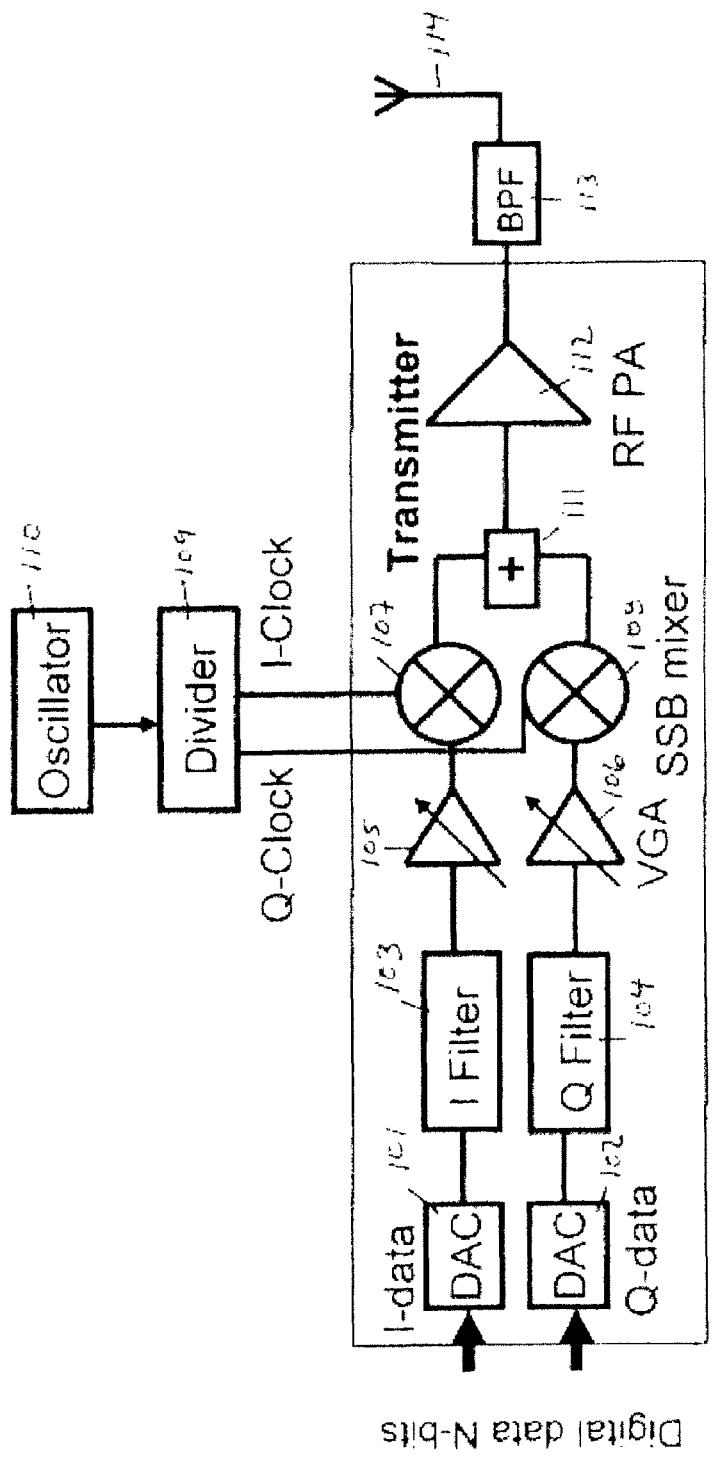
Fig 1 Block schematic of a typical analog transmitter used in RF transceivers.
PRIOR ART

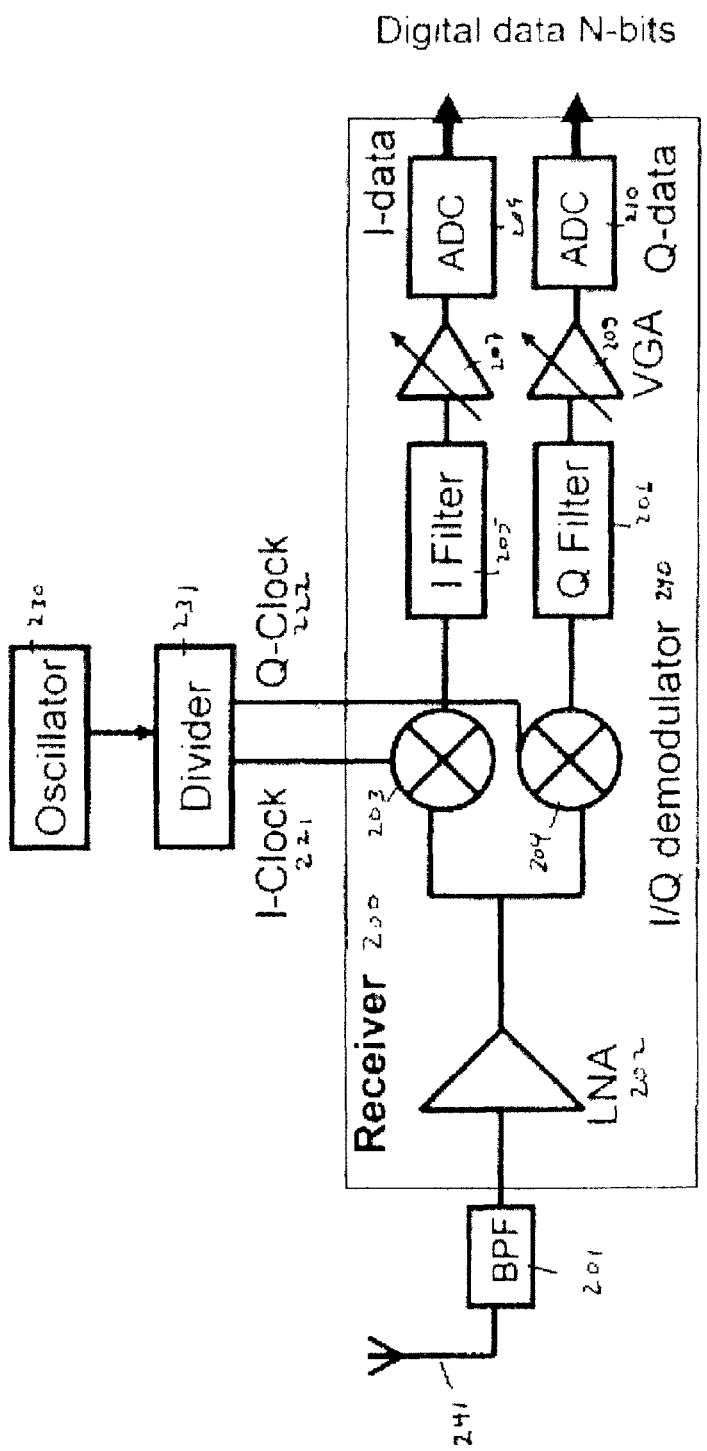
Fig. 2 Block schematic of a typical receiver used in wireless communication systems
PRIOR ART

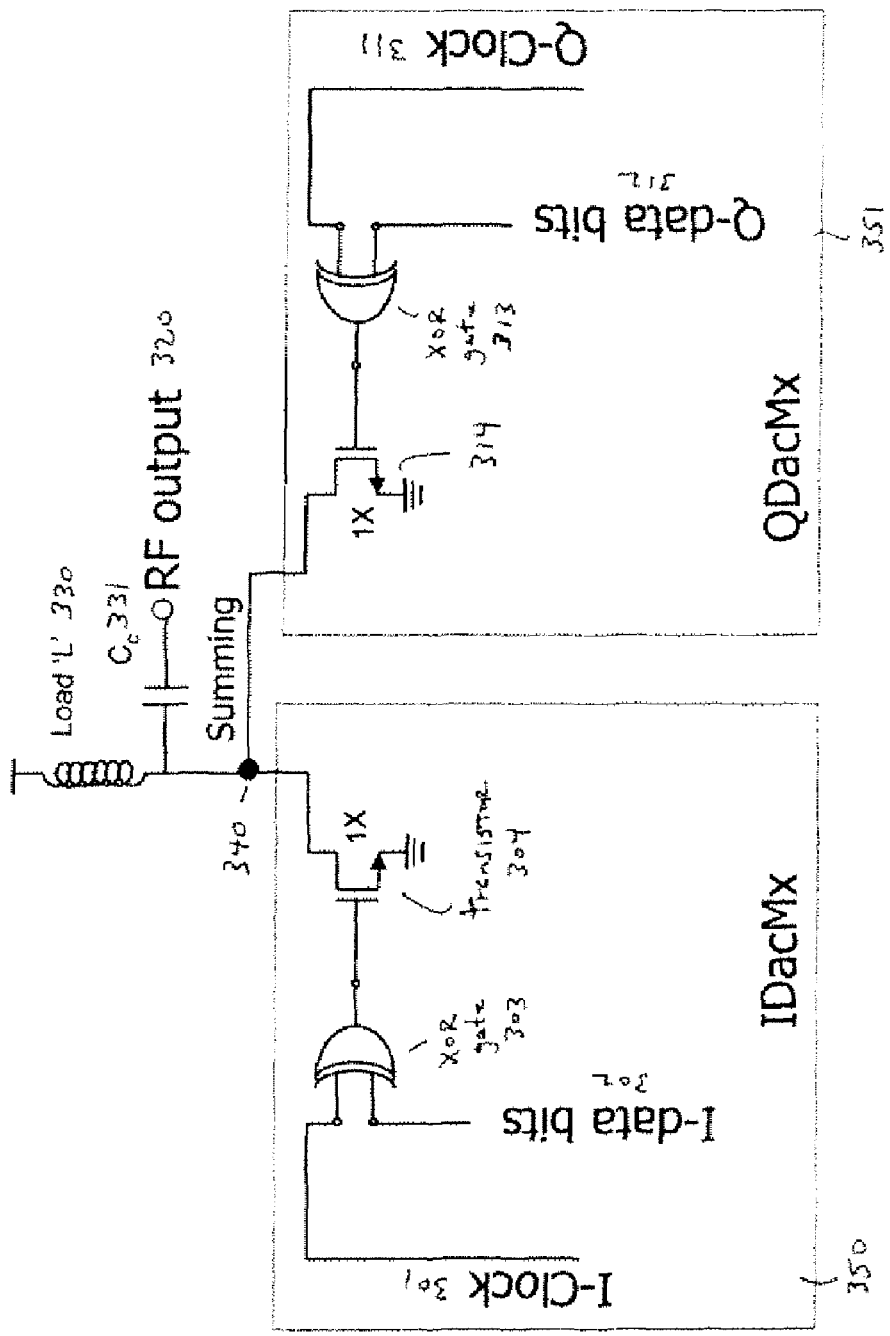
Fig. 3  Schematic of the quadrature amplitude modulation (QAM) SSB up-converter for serial (single-bit) data.

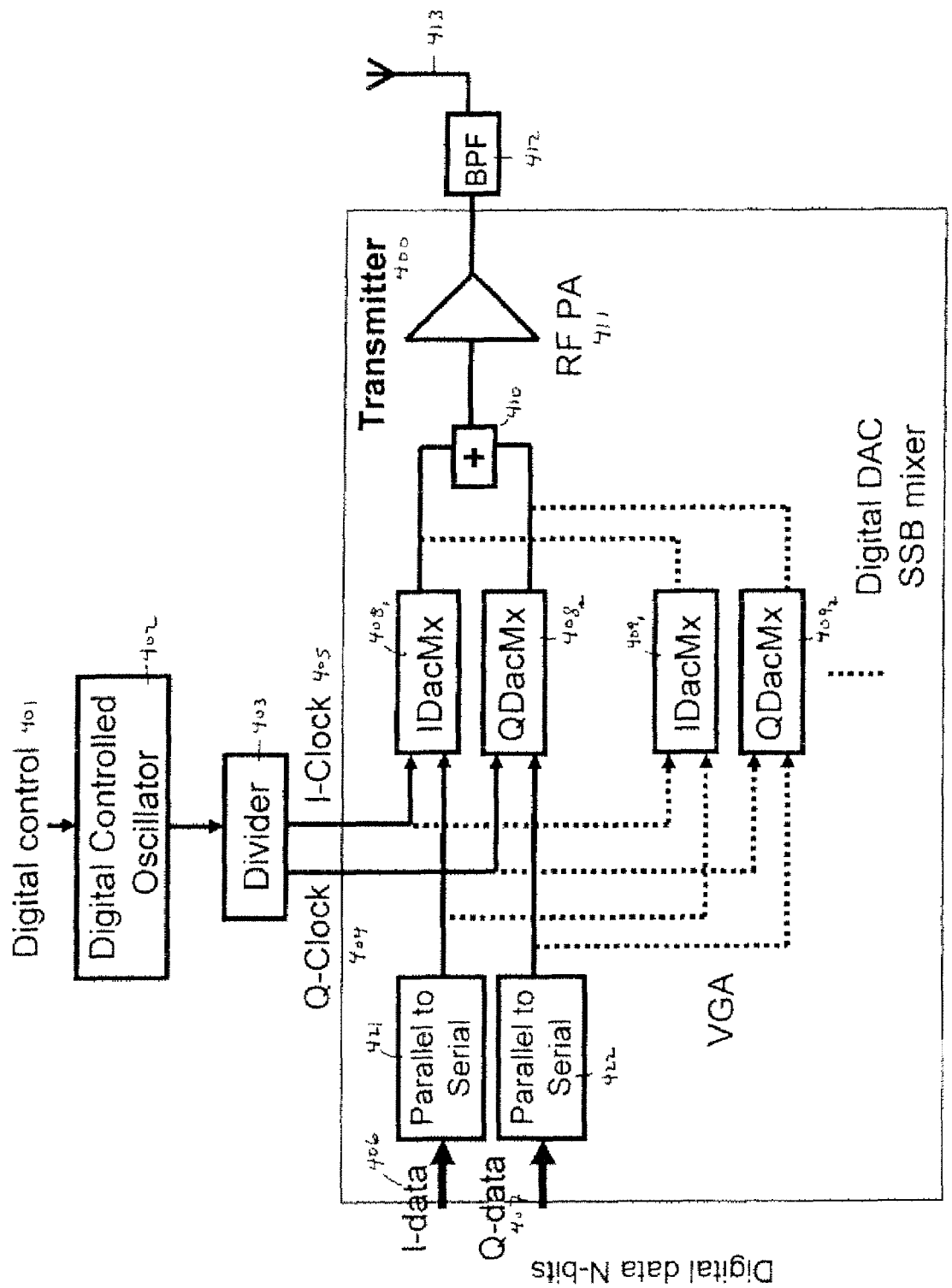
Fig. 4 Block schematic of the digital QAM SSB transmitter with all digital DAC, Mixer, VGA.

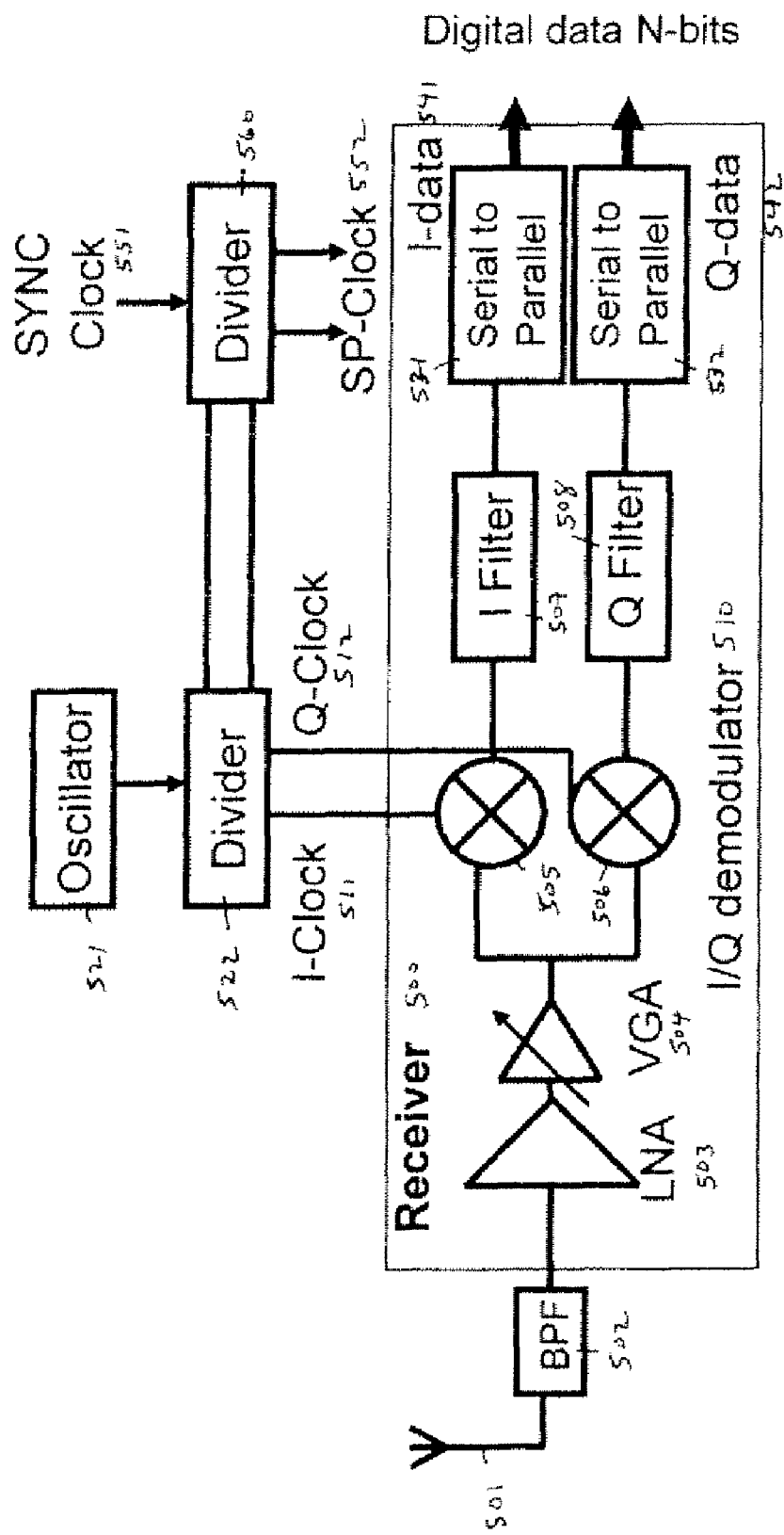
Fig. 5 Block schematic of a receiver for QAM modulated serial data for use in RF transceivers.

LOW POWER WIRELESS COMMUNICATION SYSTEM

FIELD OF THE INVENTION

The present invention is related to the field of wireless communication systems that receive and transmit digital base-band data using a quadrature amplitude modulated (QAM) RE carrier with a very low power transceiver.

BACKGROUND OF THE INVENTION

In wireless communication systems, quadrature amplitude modulation is used for transmitting the radio frequency (RF) signal. In most of the wireless systems, the information bearing base-band signal is in a digital format. In an RF transceiver, to transmit the base-band digital signal, it is converted to analog form by using a digital-to-analog (DAC) converter. This analog signal is up-converted by modulating a high frequency carrier to make it suitable for transmission. On the receiver side, the received high frequency signal is demodulated and converted to digital format by analog-to-digital (ADC) converter. The DAC and ADC are the power and silicon-area consuming blocks in a typical transceiver. The complex design of these blocks is very time consuming, resulting in a high design cost. Design complexity, power consumption and silicon-area are the important factors in mobile wireless applications for determining the cost.

FIG. 1 is a block diagram of a typical transmitter used in a radio-frequency (RF) transceiver chip of wireless communication systems. Referring to FIG. 1, the information bearing base-band signal is a digital signal having 'I' and 'Q' components, which are referred to herein as I-data and Q-data, respectively. 'I' and 'Q' are N-bit wide parallel data (where N can be in the range of 1 to 20), that are generated by a digital baseband signal processor. In the RF transceiver chip, the I-data and Q-data of the base-band digital signal are converted to analog for by using digital-to-analog (DAC) converters 101 and 102, respectively. The outputs of DACs 101 and 102 are filtered with filters 103 and 104, respectively, to remove out-of-band components introduced by DACs 101 and 102. Thereafter, the analog signals output from I filter 100 and Q filter 104 are fed into variable gain amplifiers (VGAs) 105 and 106, respectively, and then up-converted to a high frequency suitable for transmission by modulating a carrier frequency.

Many of the systems modulate the carrier as quadrature amplitude modulation (QAM) using a single-side band (SSB) mixer that is an analog RF block. In FIG. 1, a pair of mixers 107 and 108 is used. Mixer 107 up-converts the analog I-data, which has been filtered and amplified, using an I-clock output from divider 109. Mixer 108 up-converts the analog Q-data, which has been filtered and amplified, using a Q-clock output from divider 109. Divider 109 generates I-clock and Q-clock from a clock signal from oscillator 110 by dividing the frequency by two. Thus, generated I and Q clocks have half the frequency of the oscillator and they differ in phase by 90 degrees. The outputs of mixers 107 and 108 are combined using adder 111 that operates as a combiner to provide the SSB output, The output of adder 111 is amplified by RF driver amplifier (RF PA) 112. In low power systems such as UWB, Zigbee, RF IDs, usually, RF PA 112 is the final stage providing RF output for transmission, However, in the cellular and WLAN systems, the RF PA 112 act as pre-driver and provides output to an external power amplifier. A bandpass filter (BPF) 113 filters the output of amplifier 112. The signal output from BPF 113 is then transmitted using antenna 114.

FIG. 2 is a block diagram of a typical receiver used in a radio-frequency (RF) transceiver chip of wireless communication systems. In the receive mode, the signal picked up by antenna 241 is passed through a band pass filter (BPF) 201 for selecting the desired range of frequencies in which the transmitted signal is expected. After filtering by BPF 201, the signal is amplified by a low noise amplifier (LNA) 202. Thereafter, the signal is demodulated by I mixer 203 and Q mixer 204 of I/Q demodulator 240 to provide I and Q baseband signals in analog format. I mixer 203 and Q mixer 204 are driven by "in-phase" (I) clock 221 and 'quadrature' (Q) clock 222 generated using oscillator 230 and divider 231 as described above for the transmit signal. The I and Q signals are filtered by I filter 205 and Q filter 206, respectively. The demodulated analog baseband signals are amplified by variable gain amplifiers (VGAs) 20, and 208 to bring it to suitable amplitude level as required for ADCs 209 and 210. ADCs 209 and 210 convert I and Q analog signal into digital format. The digital I and Q signals are passed on to the base-band processor for further processing of the received data.

As can be observed from the FIGS. 1 and 2, that the ADCs and DACs are used in the communication systems. These blocks are difficult to design and increase the complexity of the transceiver.

SUMMARY OF THE INVENTION

A transmitter, a receiver, and a transceiver for use in a wireless communication system are disclosed. In one embodiment, the radio frequency (RF) transmitter comprises a first parallel-to-serial converter to convert first parallel data corresponding to a I quadrature baseband signal component into a first set of serial data bits, a second parallel-to-serial converter to convert second parallel data corresponding to a Q quadrature baseband signal component into a second set of serial data bits, and one or more stages having a first XOR gate coupled to a gate terminal of a first transistor and a second XOR gate coupled to a gate terminal of a second transistor. The first XOR gate has a pair of inputs coupled to the first set of serial data bits and a first clock (e.g., an I clock) that corresponds to the I quadrature baseband signal component, and has a first output coupled to drive the gate terminal of the first transistor, while the second XOR gate has a pair of inputs coupled to the second set of serial data bits and a second clock (e.g., the Q clock) that corresponds to the Q quadrature baseband signal component, and has a second output coupled to drive the gate terminal of the second transistor. The first and second outputs are summed at a node to obtain a single-side band (SSB) RF output.

In another embodiment, an RF receiver comprises an antenna to receive wirelessly transmitted signals; an I/Q demodulator to demodulate QAM modulated serial data; an I filter to filter demodulated serial data corresponding to the I quadrature baseband signal; a Q filter to filter demodulated serial data corresponding to the Q quadrature baseband signal; a first serial-to-parallel converter to convert demodulated serial data corresponding to the I quadrature baseband signal into a first plurality of parallel I-data bits; and a second serial-to-parallel converter to convert demodulated serial data corresponding to the Q quadrature baseband signal into a second plurality of parallel Q-data bits.

In yet another embodiment, a transceiver includes both the transmitter and described above.

DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a block diagram of a typical transmitter used in a radio-frequency (RF) transceiver chip of wireless communication systems.

FIG. 2 illustrates a block diagram of a typical receiver used in a radio-frequency (RF) transceiver chip of wireless communication systems.

FIG. 3 is a circuit schematic of one embodiment of a digital up-converting SSB mixer.

FIG. 4 is a schematic of one embodiment of a digital transmitter having a parallel-to-serial converter.

FIG. 5 is a schematic of one embodiment of a receiver for demodulating the serial data and having a serial-to-parallel converter.

DETAILED DESCRIPTION OF THE PRESENT INVENTION

A transmitter, receiver, and wireless communication device for using the same are described. In one embodiment, the wireless communication systems receive and transmit digital base-band data directly without DAC or ADC using a quadrature amplitude modulated (QAM) RE carrier with a very low power transceiver. This method is useful for, but not limited to, short range low power applications such as, for example, body area networks, Zigbee, RE ID, ultra-wide band (UWB). However, it can also be used in cellular systems, wireless local area networking (WLAN), MiMO, Wi-Fi, WiMax etc, for low data rates.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to) perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A transceiver is disclosed that does not require the use of ADCs and DACs. This architecture simplifies the transceiver complexity and results in a compact transceiver with lower power consumption. The low power is a key requirement in battery operated mobile communication system.

In one embodiment, a signal is transmitted directly in digital format with an all-digital transmitter. The digital signal, which is N-bit parallel data, is converted into serial data using parallel-to-serial converters. For digital data, the parallel-to-serial converters are well known in the literature. These are also referred as 'serdes' in the data communication literature.

A transceiver is disclosed that comprises a transmitter and a receiver, where the transmitter and receiver are without an analog-to-digital converters (ADCs) and a digital-to-analog converter (DACs). The transceiver includes one or more antennas coupled to the transmitter and the receiver. In one embodiment, the transmitter described herein performs quadrature amplitude modulation to generate a single-side band (SSB) signal for RF transmission.

In one embodiment, the radio frequency (RF) transmitter comprises a first parallel-to-serial converter to convert first parallel data corresponding to a I quadrature baseband signal component into a first set of serial data bits, a second parallel-to-serial converter to convert second parallel data corresponding to a Q quadrature baseband signal component into a second set of serial data bits, and one or more stages having a first XOR gate coupled to a first transistor and a second XOR gate coupled to a second transistor. The first XOR gate has a pair of inputs coupled to the first set of serial data bits and a first clock (e.g., an I clock) that corresponds to the I quadrature baseband signal component, and has a first output coupled to drive the first transistor, while the second XOR gate has a pair of inputs coupled to the second set of serial data bits and a second clock (e.g., the Q clock) that corresponds to the Q quadrature baseband signal component, and has a second output coupled to drive the second transistor. The first and second outputs are summed at a node to obtain a single-side band (SSB) RF output.

In one embodiment, the I and Q clocks corresponding to the I and Q quadrature baseband signal components differ in phase by 90 degrees.

In operation, the transmitter converts parallel data corresponding to a I quadrature baseband signal component into a first set of serial data bits, converts parallel data corresponding to a Q quadrature baseband signal component into a second set of serial data bits, performs a first set of XOR operation on the first set of serial data bits using a first XOR gate with a first clock signal (e.g., an I clock) as an input to the first XOR gate, performs a first set of XOR operation on the second set of serial data bits using a second XOR gate with a second clock signal (e.g., a Q clock) as an input to the second XOR gate, drives first and second transistors with outputs generated from performing the first and second sets of XOR operations, and sums the outputs of the first and second transistors to obtain a single-side band (SSB) RF output.

In one embodiment, radio frequency (RF) receiver comprises an antenna to receive wirelessly transmitted signals, an I/Q demodulator to demodulate QAM modulated serial data, an I filter to filter demodulated serial data corresponding to the I quadrature baseband signal, a Q filter to filter demodulated serial data corresponding to the Q quadrature baseband signal, a first serial-to-parallel converter to convert demodulated serial data corresponding to the I quadrature baseband signal into a first plurality of parallel I-data bits, and a second serial-to-parallel converter to convert demodulated serial data corresponding to the Q quadrature baseband signal into a second plurality of parallel Q-data bits. In one embodiment, the I and Q clocks corresponding to the I and Q quadrature baseband signal components are set equal to clocks used during transmit when generating the wirelessly transmitted signals. In one embodiment, the serial-to-parallel converters generate parallel data according to a first clock (e.g., SP) signal. In one embodiment, the first clock signal is synchronized to clocking of received serial data and the I/Q demodulator.

Note that in alternative embodiments, the transmitter and receiver may be used separately or contained in separate systems and devices.

Transmitter and Receiver Embodiments

For the case of serial data, the circuit schematic of the up-converter mixer is shown in FIG. 3. In one embodiment, the baseband data in quadrature format, i.e. I and Q, are used directly without conversion to the polar format. In one embodiment, the baseband data in quadrature format is generated by a digital baseband signal processor (not shown to avoid obscuring the present invention). The clock having frequency equal to the carrier frequency has also an in-phase component (I-clock) and a quadrature component (Q-clock). The quadrature clock, Q-clock, is 90 degree phase shifted with respect to the in-phase clock, I-clock. Methods for generating the clocks are well known in the literature, with a more common one being, the use of a divide-by-two circuit that provides the required clock components.

Referring to FIG. 3, there is an IDacMx block 350 and a QDacMx block 351. In IDacMx block 350, XOR gate 303 has a pair of inputs. One input is coupled to i-clock 301 and the other input is coupled to I-data bits 302. In one embodiment, I-clock 301 is an output of a divider that divides the clock signal generated by an oscillator (e.g., a digitally controller oscillator). The output of XOR gate 303 is coupled to a gate of MOS transistor 304 to drive the MOS transistor. In one embodiment, the drain and source of MOS transistor 304 are coupled to summing node 340 and ground, respectively. In QDacMx block 351, XOR gate 313 has a pair of inputs. One input is coupled to Q-clock 311 and the other input is coupled to Q-data bits 312. In one embodiment, Q-clock 311 is an output of a divider that divides the clock signal generated by an oscillator (e.g., a digitally controller oscillator). The output of XOR gate 313 is coupled to a gate of MOS transistor 314 to drive the MOS transistor. In one embodiment, the drain and source of MOS transistor 314 are coupled to summing node 340 and ground, respectively.

In operation, data components of I-data bits 302 and Q-data bits 312 are digitally multiplied by their respective clocks by making them inputs of the NOR gates. That is, the base-band serial data I and Q are multiplied by the corresponding I-clock and Q-clock and the output is summed to provide QAM single-side band up-converted signal, where the multiplier blocks 'IDacMx ' and 'QDacMx' are simply XOR gates as shown in FIG. 3.

FIG. 4 illustrates a circuit schematic of one embodiment of a digital QAM SSB transmitter having a parallel-to-serial converter, a mixer and a VGA. By using the parallel-to-serial converter, the serial data is transmitted by the transmitter with quadrature amplitude modulation (QAM). The carrier frequency is fixed by the clocks I and Q, which have the same frequency but differ in phase by 90 degrees.

While converting the parallel N-bit base-band data into serial format, the bandwidth of the signal is increased by N-times. If the channel bandwidth is specified for a given standard, the maximum data rate to be used by this scheme is reduced by a factor N of the maximum possible or allowed data rate. However, as there are no ADC and DAC in the transceiver, a very simple transceiver with a considerable power saving can be used. Therefore, this scheme is especially useful for low data rate application such as in RF IDs, sensors and body area networks etc. where a very low power transceiver is a prime requirement.

Referring to FIG. 4, transmitter 400 receives S-data 406 and Q-data 407, along with Q-lock 404 and I-clock 405. In one embodiment, I-data 406 and Q-data 407 are n-bits of digital data generated by a digital baseband signal processor. I-data 406 is converted into serial format by parallel-to-serial converter 421, while Q-data 407 is converted into serial format by parallel-to-serial converter 422.

Q-clock 404 and I-clock 405 are output from divider 403 which receives a clock signal from digital controlled oscillator 402 responsive to digital control 401. Digital control 401 can be used to control the carrier frequency as described herein.

There are two or more stages shown, each having an IDacMx and QDacMx. For example, one stage includes IDacMx 408$_1$ and QDacMx 408$_2$, while another stage includes IDacMx 409$_1$ and QDacMx 409$_2$. Each stage receives the serialized I-data output from parallel-to-serial converter 421 and the serialed Q-data output from parallel-to-serial converter 422, along with Q-clock 404 and I-clock 405 and generates the outputs as described above in conjunction with FIG. 3. Within the two stages shown, in one embodiment, the total output would be double, thereby providing, a gain of 6 dB. More such stages may be implemented if more gain range is required. In reverse, to reduce the gain, one such stage is switched off to reduce the gain by 6 dB.

All the outputs from the stages are added together with adder 410. In one embodiment, this is performed by putting all the drains at one node. The output of adder 410 is amplified by amplifier 411 and then output from transmitter 400. The output from amplifier 411 is filtered using BPF 412 and transmitted using antenna 413.

A receiver receives the QAM modulated serial data. FIG. 5 is a block schematic diagram of one embodiment of a receiver for QAM modulated data for use in RF transceivers. Referring to FIG. 5 in the receive mode, the signal picked up by antenna 501 is passed through a band pass filter (BPF) 502 for band-limiting the signal for selecting the desired range of frequencies in which the transmitted signal is expected. After filtering by BPF 502, the signal is amplified by a low noise amplifier (LNA) 503 and a variable gain amplifier (VGA) 504, which brings the signal to a suitable level for demodulation. Thereafter, the signal is demodulated by I mixer 505 and Q mixer 506 of I/Q demodulator 510 to provide I and Q base-band signals in analog format. I mixer 505 and Q mixer 506 are driven by 'in-phase' (I) clock 511 and quadrature (Q) clock 512 generated using oscillator 521 and divider 522 as described above for the transmit signal. The I and Q signals are filtered by I filter 507 and Q filter 508, respectively.

The demodulated analog baseband signals output from I filter 507 and Q filter 508 are converted from serial to parallel format using serial-to-parallel converters 531 and 532, respectively. Serial-to-parallel converters 531 and 532 are clocked by SP clocks 552, which are derived from the clocks of oscillator 521 by using dividers 522 and 560. SP clock divider 560 is synchronized by a SYNC clock 551, which is provided by the base-band processor. Several methods of generating the synchronized clock in the base-band processor are well known in the literature.

The output of serial-to-parallel converters 531 and 532 is digital I data 541 and Q data 542, respectively. The digital I data 541 and Q data 542 are passed on to the base-band processor for further processing of the received data.

In an alternative embodiment of the receiver, the analog modulator consisting of I and Q mixers 505 and 506 is replaced by a digital demodulator having synchronized I and Q clocks. In one embodiment, the digital demodulator is implemented by the two-input XOR gates driven by the data and synchronized clocks.

The architecture of the transceiver described above is well suited for a software defined radios (SDR) as the carrier frequency can be easily changed by varying the clock frequency. The SDR can implement various applications for different standards just by changing the clock controlled by the software.

As most of the circuitry used in the transceiver described herein is digital, the design is very much simplified, thereby reducing the design-time. Also, digital circuits do not consume any power in the 'standby' and 'off' states. Therefore, the total power consumption is reduced by a great amount.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A radio frequency (RF) transmitter comprising:
a first parallel-to-serial converter to convert first parallel data corresponding to a I quadrature baseband signal component into a first set of serial data bits;
a second parallel-to-serial converter to convert second parallel data corresponding to a Q quadrature baseband signal component into a second set of serial data bits;
a plurality of stages, wherein each of the plurality of stages may be activated or deactivated to provide variable gain, and wherein each of the plurality of stages comprises:
a first XOR gate coupled to a first transistor, the first XOR gate having a pair of inputs coupled to the first set of serial data bits and a first clock that corresponds to the I quadrature baseband signal component, and having a first output coupled to drive a gate terminal of the first transistor, wherein a source terminal of the first transistor is coupled directly to ground, the first transistor to convert the first set of serial data bits corresponding to the I quadrature baseband signal component from digital-to-analog without using a digital-to-analog converter; and
a second XOR gate coupled to a second transistor, the second XOR gate having a pair of inputs coupled to the second set of serial data bits and a second clock that corresponds to the Q quadrature baseband signal component, and having a second output coupled to drive a gate terminal of the second transistor, wherein a source terminal of the second transistor is coupled directly to ground, the second transistor to convert the second set of serial data bits corresponding to the Q quadrature baseband signal component from digital-to-analog without using a digital-to-analog converter; and
a mixer to sum the first and second outputs of each of the plurality of stages at a node to obtain a single-side band (SSB) RF output.

2. The transmitter defined in claim 1 wherein the I and Q clocks corresponding to the I and Q quadrature baseband signal components differ in phase by 90 degrees.

3. The transmitter defined in claim 1 wherein further comprising a load coupled to the node.

4. The transmitter defined in claim 1 further comprising a power amplifier having an input coupled to the output.

5. The transmitter defined in claim 1 further comprising:
a bandpass filter coupled to the output; and
an antenna coupled to the bandpass filter.

6. A radio frequency (RF) transmitter comprising:
a first parallel-to-serial converter to convert first parallel data corresponding to a I quadrature baseband signal component into a first set of serial data bits;
a second parallel-to-serial converter to convert second parallel data corresponding to a Q quadrature baseband signal component into a second set of serial data bits;
a plurality of stages, wherein each of the plurality of stages may be activated or deactivated to provide variable gain, and wherein each of the plurality of stages has
a first XOR gate coupled to a first transistor, the first XOR gate having a pair of inputs coupled to the first set of serial data bits and a first clock that corresponds to the I quadrature baseband signal component, and having a first output coupled to drive a gate terminal of the first transistor, wherein a source terminal of the first transistor is coupled directly to ground, the first transistor to convert the first set of serial data bits corresponding to the I quadrature baseband signal component from digital-to-analog without using a digital-to-analog converter; and a second XOR gate coupled to a second transistor, the second XOR gate having a pair of inputs coupled to the second set of serial data bits and a second clock that corresponds to the Q quadrature baseband signal component, and having a second output coupled to drive a gate terminal of the second transistor, wherein a source terminal of the second transistor is coupled directly to ground, the second transistor to convert the second set of serial data bits corresponding to the Q quadrature baseband signal component from digital-to-analog without using a digital-to-analog converter; and a mixer to sum the first and second outputs of each of the plurality of stages at a node to obtain a single-side band (SSB) RF output.

7. A method comprising:

converting first parallel data corresponding to a I quadrature baseband signal component into a first set of serial data bits;

converting second parallel data corresponding to a Q quadrature baseband signal component into a second set of serial data bits;

switching a plurality of stages, wherein each of the plurality of stages may be activated or deactivated to provide variable gain, and wherein each of the plurality of stages comprises:

performing a first set of XOR operation on the first set of serial data bits using a first XOR gate with a first clock signal as an input to the first XOR gate;

performing a first set of XOR operation on the second set of serial data bits using a second XOR gate with a second clock signal as an input to the second XOR gate; and driving gate terminals of first and second transistors with outputs generated from performing the first and second sets of XOR operations, wherein source terminals of the first and second transistors are coupled directly to ground, the first and second transistors to convert the first and second sets of serial data bits corresponding to the I and Q quadrature baseband signal components from digital-to-analog without using a digital-to-analog converter; and summing the outputs of the first and second transistors of each of the plurality of stages to obtain a single-side band (SSB) RF output.

8. The method defined in claim 7 wherein the first clock signal and the second clock signal are I and Q clocks, respectively, and further wherein the I and Q clocks are variable and equal to the carrier frequency.

9. A radio frequency (RF) receiver comprising:

an antenna to receive wirelessly transmitted signals;

an I/Q demodulator to demodulate QAM modulated serial data, the I/Q demodulator comprising:

a first XOR gate coupled to a first transistor, the first XOR gate having a pair of inputs coupled to a first set of serial data bits corresponding to an I quadrature baseband signal and an I clock signal, and having a first output coupled to drive a gate terminal of the first transistor, wherein a source terminal of the first transistor is coupled directly to ground, the first transistor to convert the first set of serial data bits corresponding to the I quadrature baseband signal component from analog-to-digital without using an analog-to-digital converter; and a second XOR gate coupled to a second transistor, the second XOR gate having a pair of inputs coupled to a second set of serial data bits corresponding to a Q quadrature baseband signal and a Q clock signal, and having a second output coupled to drive a gate terminal of the second transistor, wherein a source terminal of the second transistor is coupled directly to ground, the second transistor to convert the second set of serial data bits corresponding to the Q quadrature baseband signal component from analog-to-digital without using an analog-to-digital converter;

an I filter to filter demodulated serial data corresponding to the I quadrature baseband signal;

a Q filter to filter demodulated serial data corresponding to the Q quadrature baseband signal;

a first serial-to-parallel converter to convert demodulated serial data corresponding to the I quadrature baseband signal into a first plurality of parallel I-data bits; and a second serial-to-parallel converter to convert demodulated serial data corresponding to the Q quadrature baseband signal into a second plurality of parallel Q-data bits.

10. The receiver defined in claim 9 wherein the I and Q clocks corresponding to the I and Q quadrature baseband signal components are set equal to clocks used during transmit when generating the wirelessly transmitted signals.

11. The receiver defined in claim 9 wherein the first and second serial-to-parallel converters generate parallel data according to a first clock signal.

12. The receiver defined in claim 11 wherein the first clock signal is synchronized to clocking of received serial data and the I/Q demodulator.

13. The receiver defined in claim 11 further comprising:

an oscillator to generate an oscillator clock signal; and at least one divider to divide the oscillator clock signal to create the pair of I and Q clock signals with a frequency equal to the carrier frequency, wherein the first clock signal is derived from the pair of I and Q clock signals.

14. The receiver defined in claim 9 wherein the I/Q demodulator comprises a pair of mixers.

15. The receiver defined in claim 9 further comprising:

a bandpass filter coupled to the antenna to filter the signal to create a band limited signal.

16. The receiver defined in claim 15 further comprising:

a low noise amplifier (LNA) coupled to an output of the bandpass filter; and a variable gain amplifier coupled to an output of the LNA, the variable gain amplifier having an output coupled to the input of the I/Q demodulator.

* * * * *